(12) United States Patent
Larson et al.

(10) Patent No.: US 11,634,016 B2
(45) Date of Patent: Apr. 25, 2023

(54) VEHICLE ROOF

(71) Applicant: Bestop, Inc., Louisville, CO (US)

(72) Inventors: John Larson, Louisville, CO (US);
David A. Smith, Macomb Township, MI (US); Eric D. Getzschman, New Baltimore, MI (US); Tommy L. Knight, Brighton, CO (US)

(73) Assignee: BESTOP, INC, Louisville, CO (US)

( * ) Notice: Subject to any disclaimer, the term of this patent is extended or adjusted under 35 U.S.C. 154(b) by 57 days.

(21) Appl. No.: 17/203,726

(22) Filed: Mar. 16, 2021

(65) Prior Publication Data
US 2021/0309084 A1    Oct. 7, 2021

Related U.S. Application Data

(60) Provisional application No. 62/990,285, filed on Mar. 16, 2020.

(51) Int. Cl.
*B60J 7/08* (2006.01)
(52) U.S. Cl.
CPC .................................. *B60J 7/08* (2013.01)
(58) Field of Classification Search
CPC ..... B60J 7/12; B60J 7/1291; B60J 7/08; B60J 7/0053; B60J 7/11; B60J 7/02; B60J 1/1823; B60J 1/18; B60J 1/1807
USPC .......... 296/216.02, 216.03, 107.07, 218, 219
See application file for complete search history.

(56) References Cited

U.S. PATENT DOCUMENTS

| | | | | |
|---|---|---|---|---|
| 5,829,195 A | * | 11/1998 | Ojanen | B60J 1/085 160/180 |
| 7,367,615 B1 | * | 5/2008 | Fallis, III | B60J 7/026 296/220.01 |
| 7,523,977 B2 | * | 4/2009 | Fallis, III | B60J 7/0053 296/107.09 |
| 9,114,690 B1 | * | 8/2015 | Bowles | B60J 7/061 |
| 9,346,342 B1 | * | 5/2016 | Bowles | B60J 7/06 |
| 9,415,668 B2 | * | 8/2016 | Haberkamp | B60J 5/105 |
| 2005/0001446 A1 | * | 1/2005 | Morley | B60J 1/08 296/102 |
| 2015/0115646 A1 | * | 4/2015 | Bowles | B60J 7/1265 296/107.09 |
| 2015/0151619 A1 | * | 6/2015 | Haimerl | B60J 7/1291 296/107.09 |
| 2016/0167496 A1 | * | 6/2016 | Sviberg | B60J 7/061 296/107.07 |
| 2019/0084390 A1 | * | 3/2019 | Tischer | B60J 7/10 |
| 2020/0130486 A1 | * | 4/2020 | Gauci | B60J 7/1291 |
| 2020/0223300 A1 | * | 7/2020 | Smith | B60J 7/1851 |
| 2021/0268883 A1 | * | 9/2021 | Smith | B60J 7/126 |

\* cited by examiner

*Primary Examiner* — D Glenn Dayoan
*Assistant Examiner* — Veronica M Shull
(74) *Attorney, Agent, or Firm* — Warn Partners, P.C.

(57) ABSTRACT

A roofing system for a Jeep type multiple row seating Jeep type SUV having a parallel separated longitudinal support beam structure extending roll cage with rear ends of the longitudinal support beams inclined to a belt line of the vehicle, the system including a rear rigid portion extending transverse of the vehicle, a cloth portion forward of the rigid portion covering at least a front seating row of the vehicle being openable.

15 Claims, 26 Drawing Sheets

US 11,634,016 B2

VEHICLE ROOF

FIELD OF THE INVENTION

The field of the present invention is that of roofing systems for Jeep type vehicles especially Jeep type vehicles with two row seating and an optional 3rd row or rear storage area and wherein the Jeep type vehicle has a roll cage.

BACKGROUND OF THE INVENTION

Many Jeep type sport utility vehicles have one or two rows of seating in a storage area in the rear that optionally can be used for a third row of forward or rearward facing seats. It is often desirable to provide a roofing system which allows the owner of the vehicle to customize the appearance of their vehicle. Additionally many Jeep enthusiast like to have a roofing system which is partially or totally removable to enjoy the environment in pleasant weather. It is desirable to provide a roofing system which accommodates the above noted desires.

BACKGROUND OF THE INVENTION

To make manifest the above noted and other gainful desires, a revelation of the present invention is brought forth. In several preferred embodiments the present invention endows a freedom of a roofing system for a Jeep type vehicle that is easily customize desire to meet an owners desire in appearance an additionally can be opened up to maximize the owners desire to enjoy the environment while motoring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
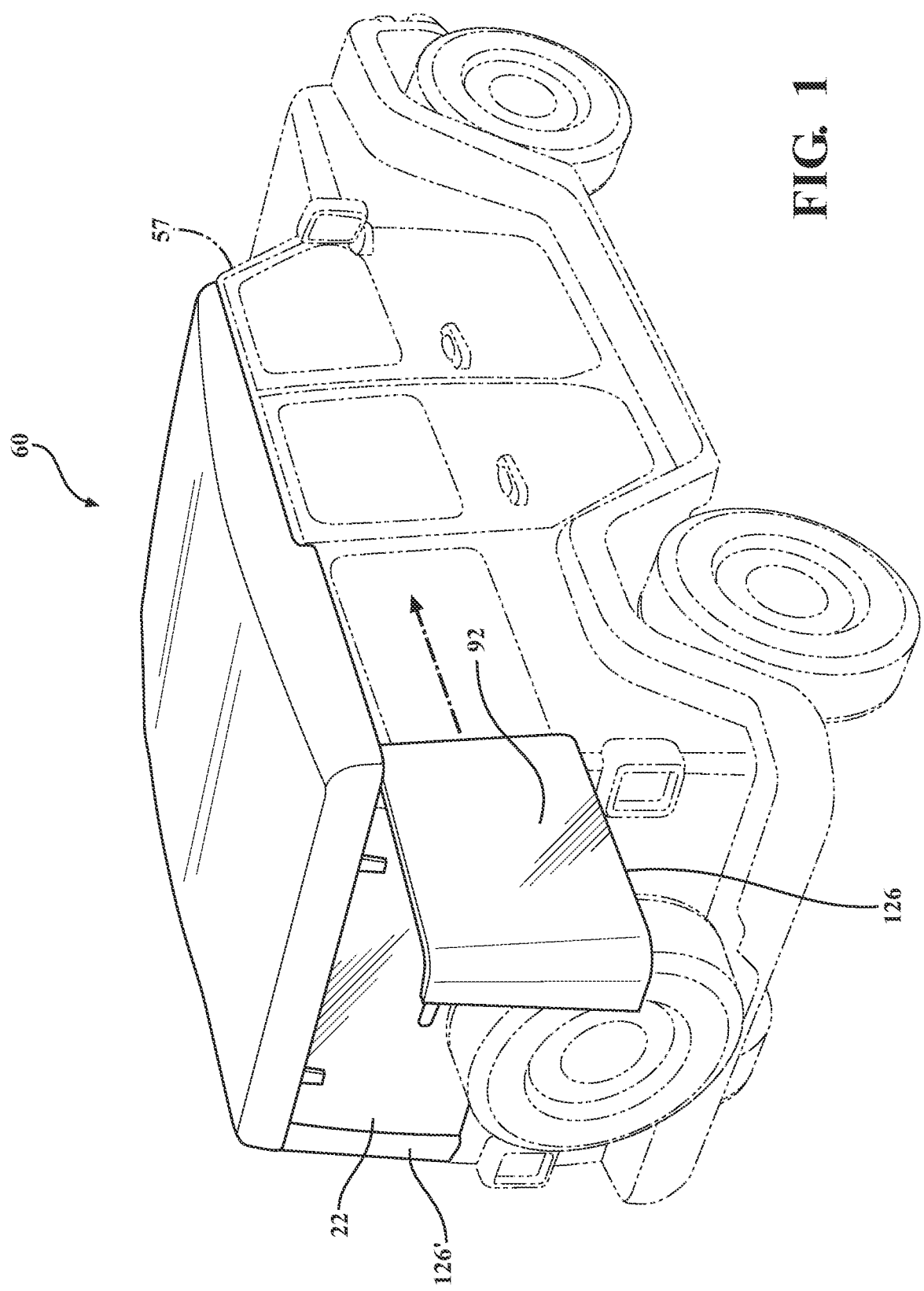
FIG. 1 is a perspective view showing JL Ultra Kinematic with deck slide in windows.
Figure 2:
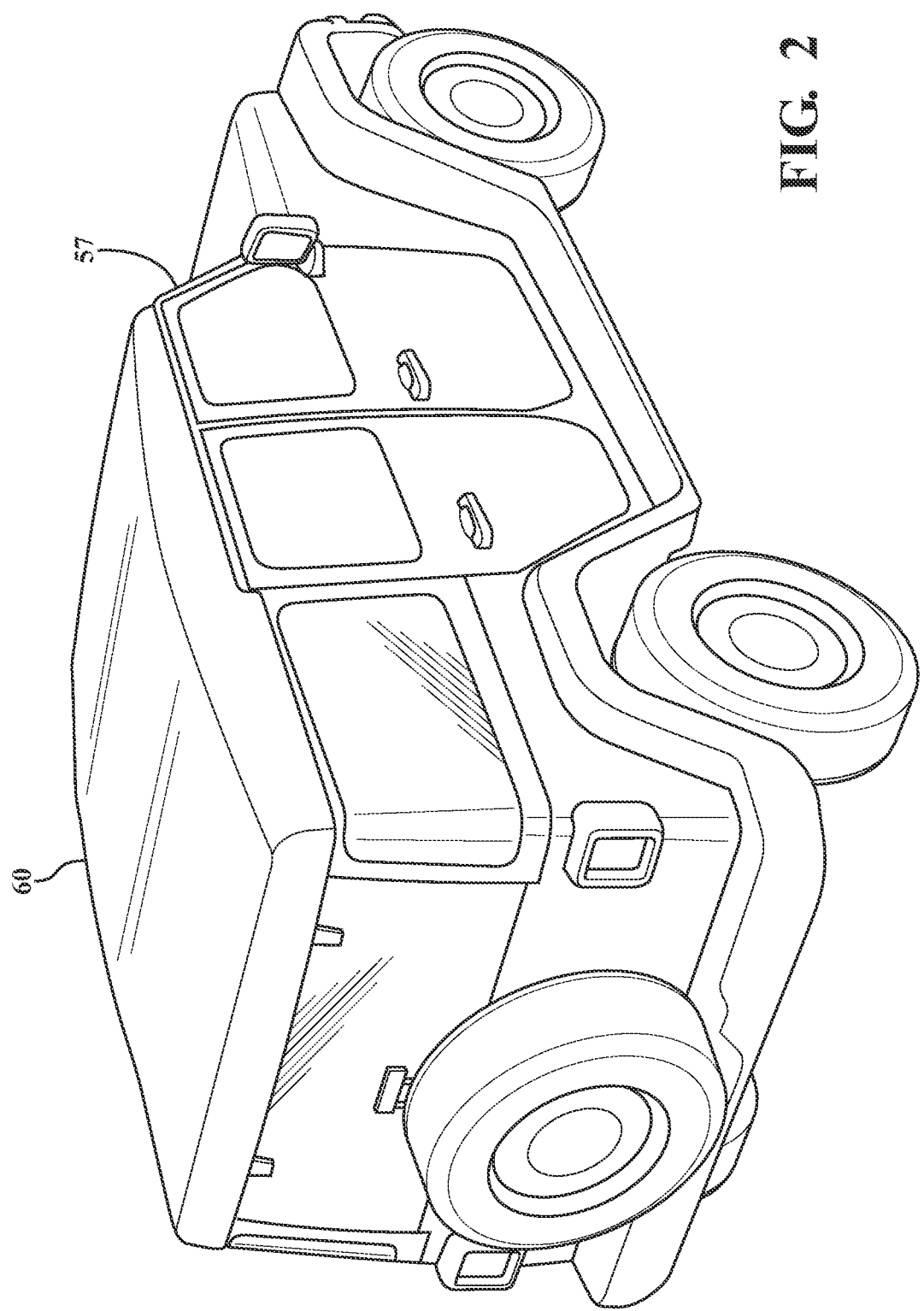
FIG. 2 is a perspective view showing JL Ultra Kinematic with PC corners RED Overlays.
Figure 3:
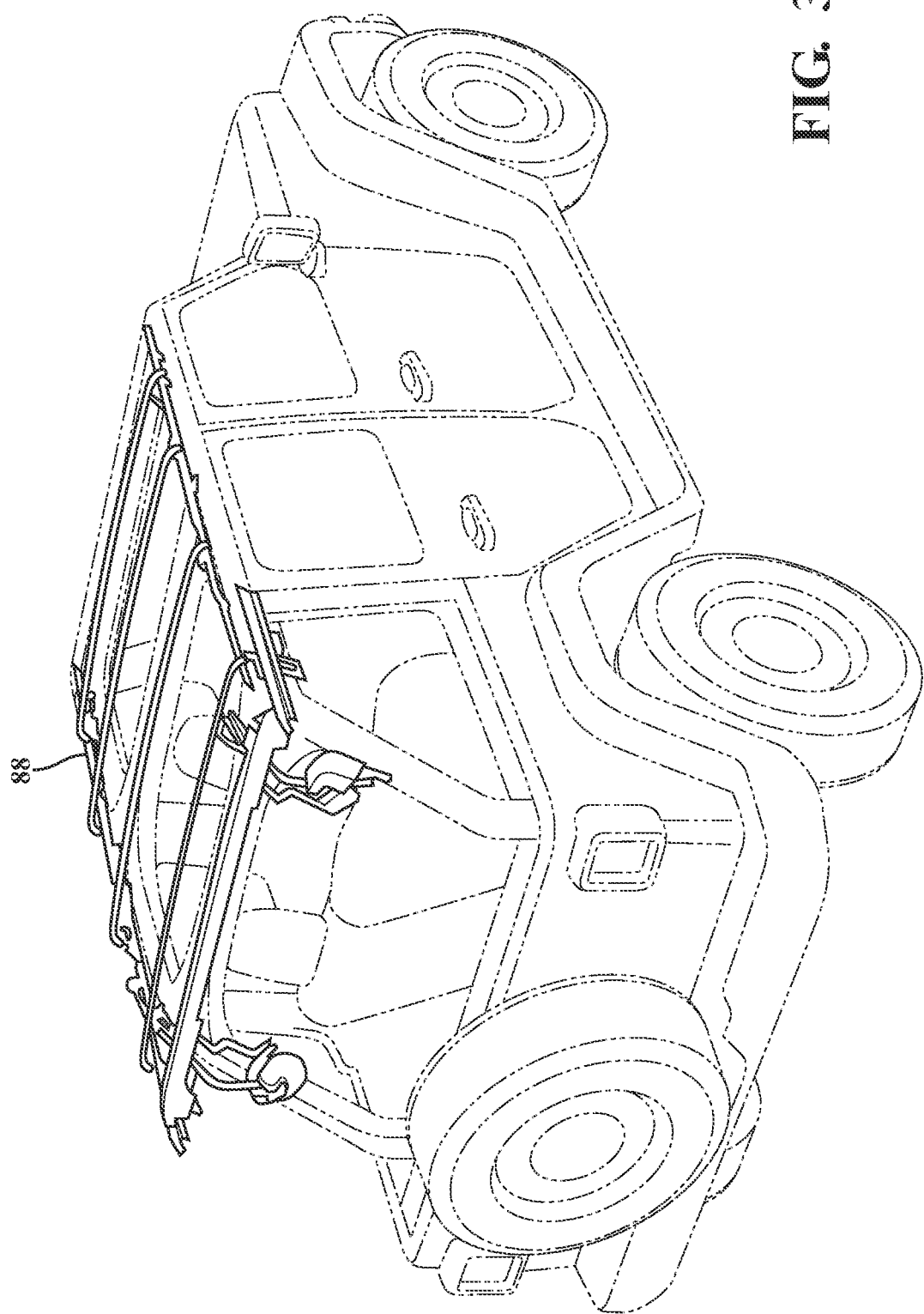
FIG. 3 is a perspective view showing JL TrekTop Ultra no Deck.
Figure 4:
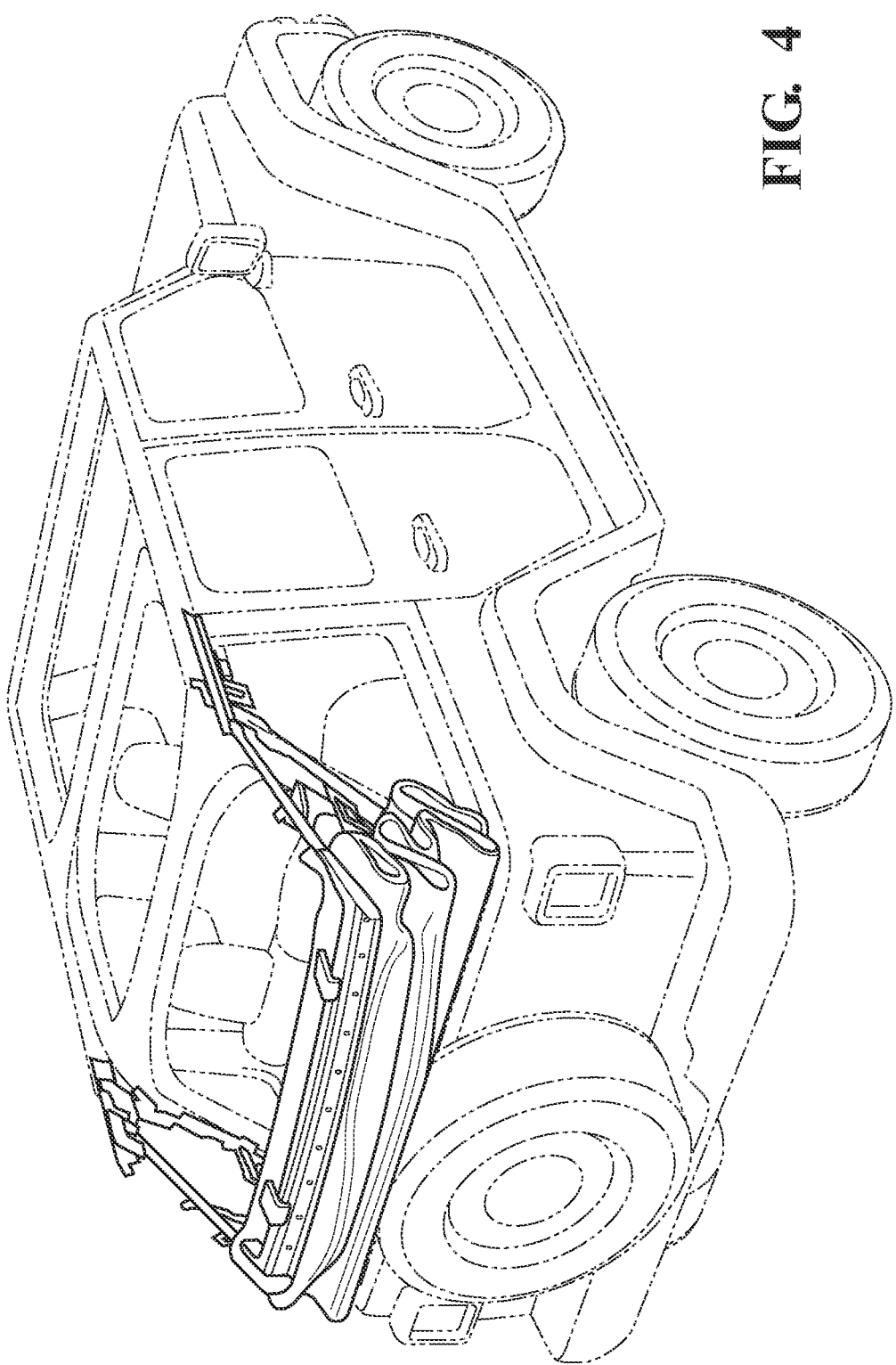
FIG. 4 is a perspective view showing JL TrekTop Ultra Side Arms Up Downstacked.

The following description of the preferred embodiment(s) is merely exemplary in nature and is in no way intended to limit the invention, its application, or uses.

DESCRIPTION OF THE PREFERRED EMBODIMENT

Referring to FIGS. 13, 24, 16 and 26 a roofing system 7 and portions of a roof system 60 are shown for a Jeep type multiple row seating Jeep type SUV or vehicle 57, having a parallel separated longitudinal support beam structure 79,79' extending from a roll cage 10 with rear ends 80, 80' of the longitudinal support beams 79, 79' inclined to a belt line 11 of the vehicle 57 is provided. The roofing system 7 has a rear rigid portion 14 extending transverse of the vehicle. A cloth portion 18 forward of the rigid portion covering at least a front seating row 82 of the vehicle is openable. The roofing system 7, 60 has a pivotable rear window 222. The roofing system 7 can have a rear quarter windows 226,226' that at least partially supports the rear rigid portion 14. The roofing system 7 includes longitudinal brackets or sidearms 30, 30' connected with the roll cage extending rearwardly therefrom at least partially supporting the rigid portion 14.

Referring to FIGS. 1-26, a roofing system 7, 60, 95 for a Jeep type multiple row seating SUV 57 is provided. The vehicle 57 has a parallel separated longitudinal support beam structure 79,79' extending roll cage 10 with rear ends 80, 80' of the longitudinal support beams inclined to belt line 11 of the vehicle 57 as previously described. FIGS. 1, 2, 5, 9, 12, 14, 16, 22, 23, 25, and 26 show the cloth cover 60 roofing system extending the full length of the roof of the vehicle 57.

Figure 23:
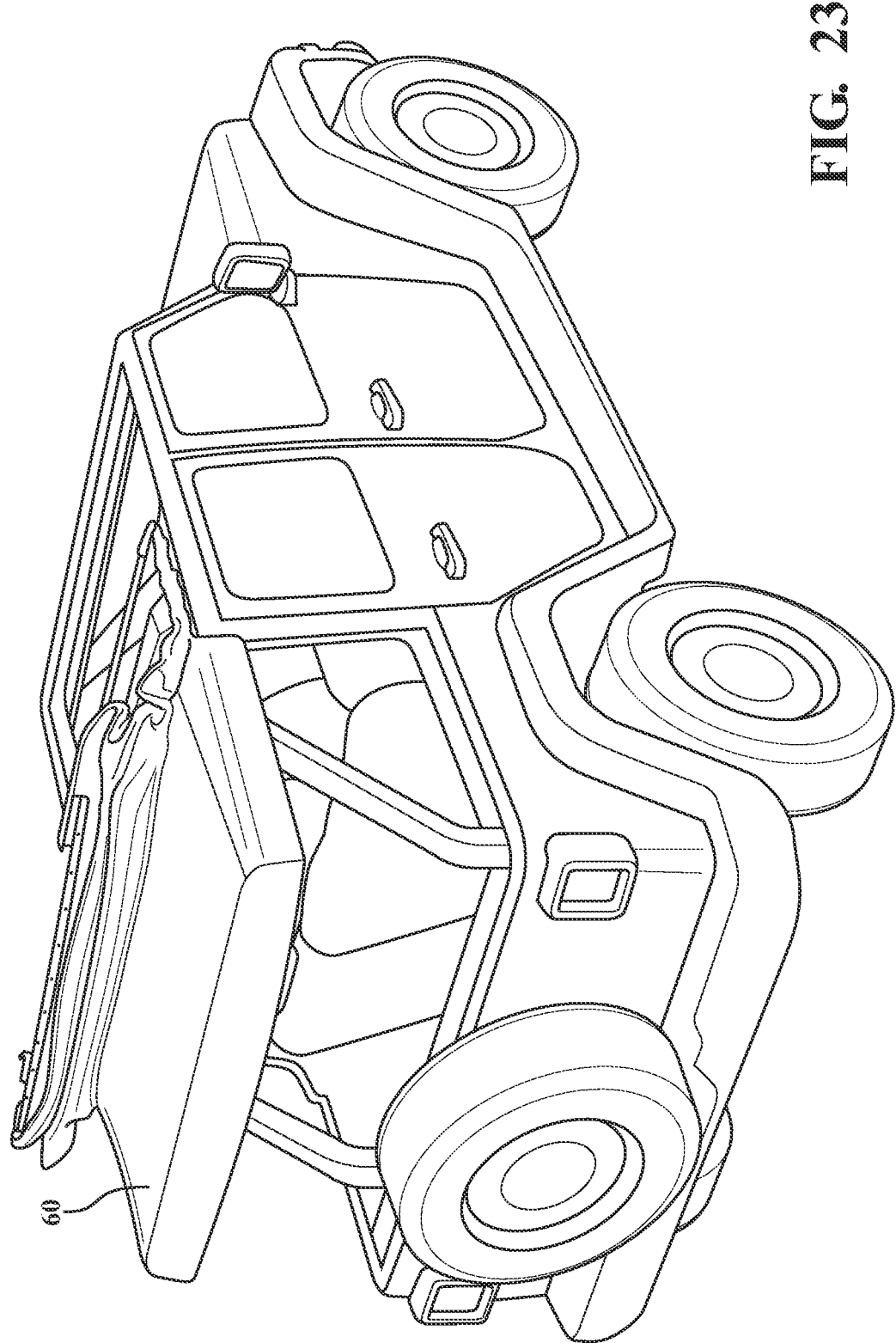
FIG. 23 is a perspective view showing JL Ultra Kinematic with all windows out Sunrider open.
Figure 24:
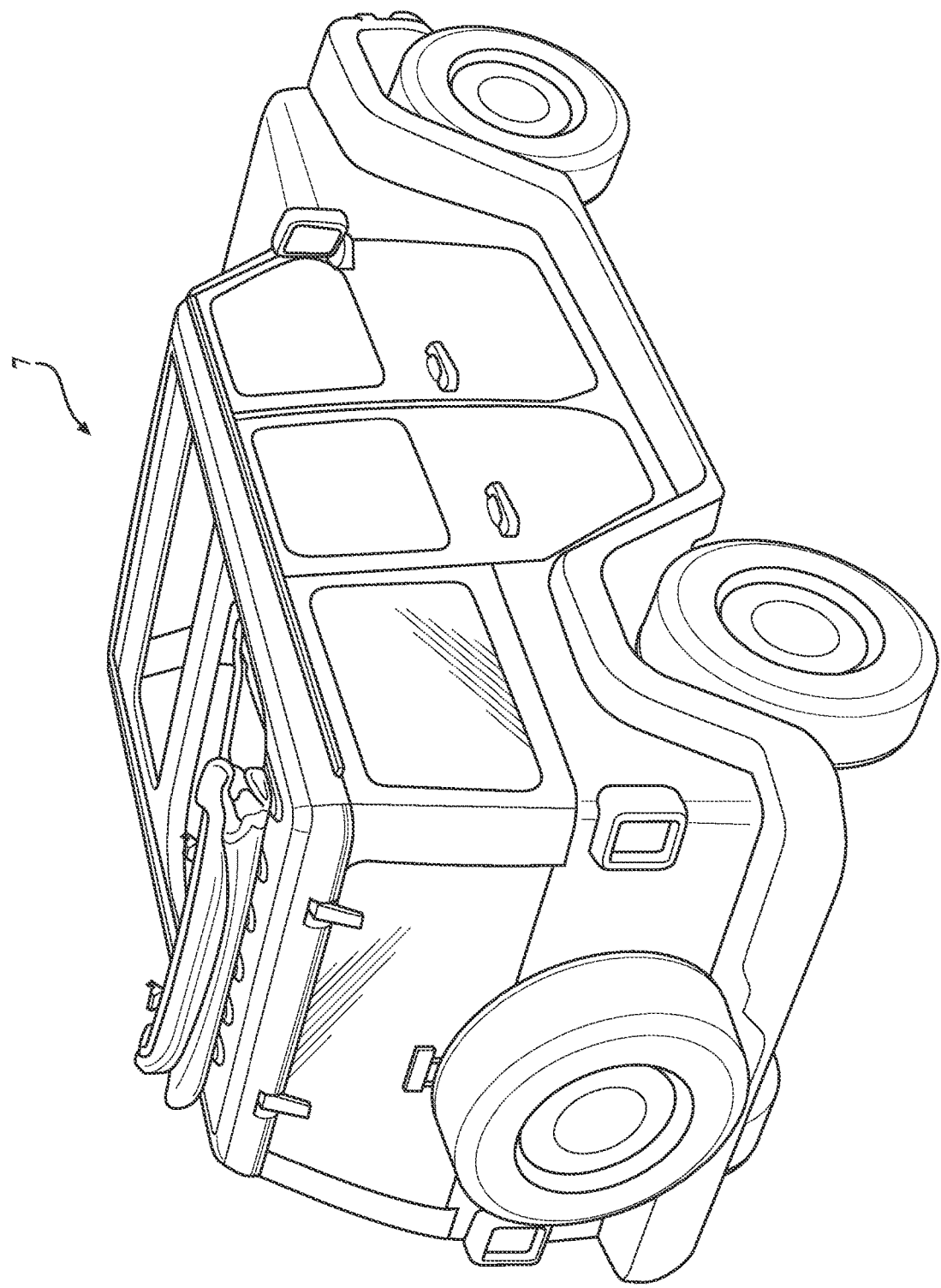
FIG. 24 is a perspective view showing Title Rigid Rear Roof With Front 2 Row Cloth Top Opened.

The roofing system 60 has a support frame structure 88 (see FIG. 25) and is openable over the two front rows 82, 83 of the vehicle (see FIG. 23). The roofing system of has two member fastener connected longitudinal brackets 70, 70', 72, 72' that are part of side arm 30, 30' respectively, (see FIGS.

Figure 5:
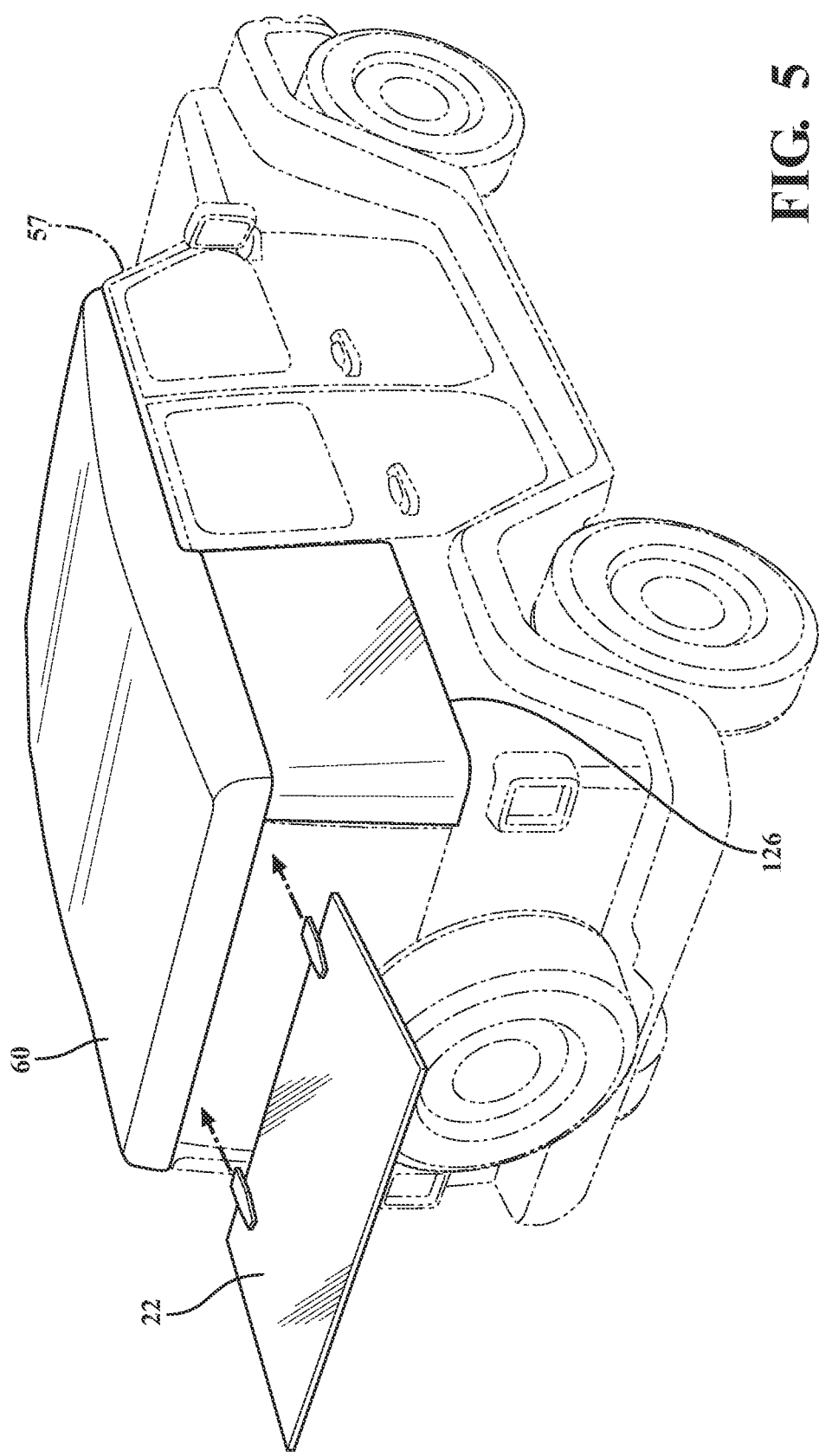
FIG. 5 is a perspective view showing JL Ultra Kinematic Rear Glass Install.
Figure 6:
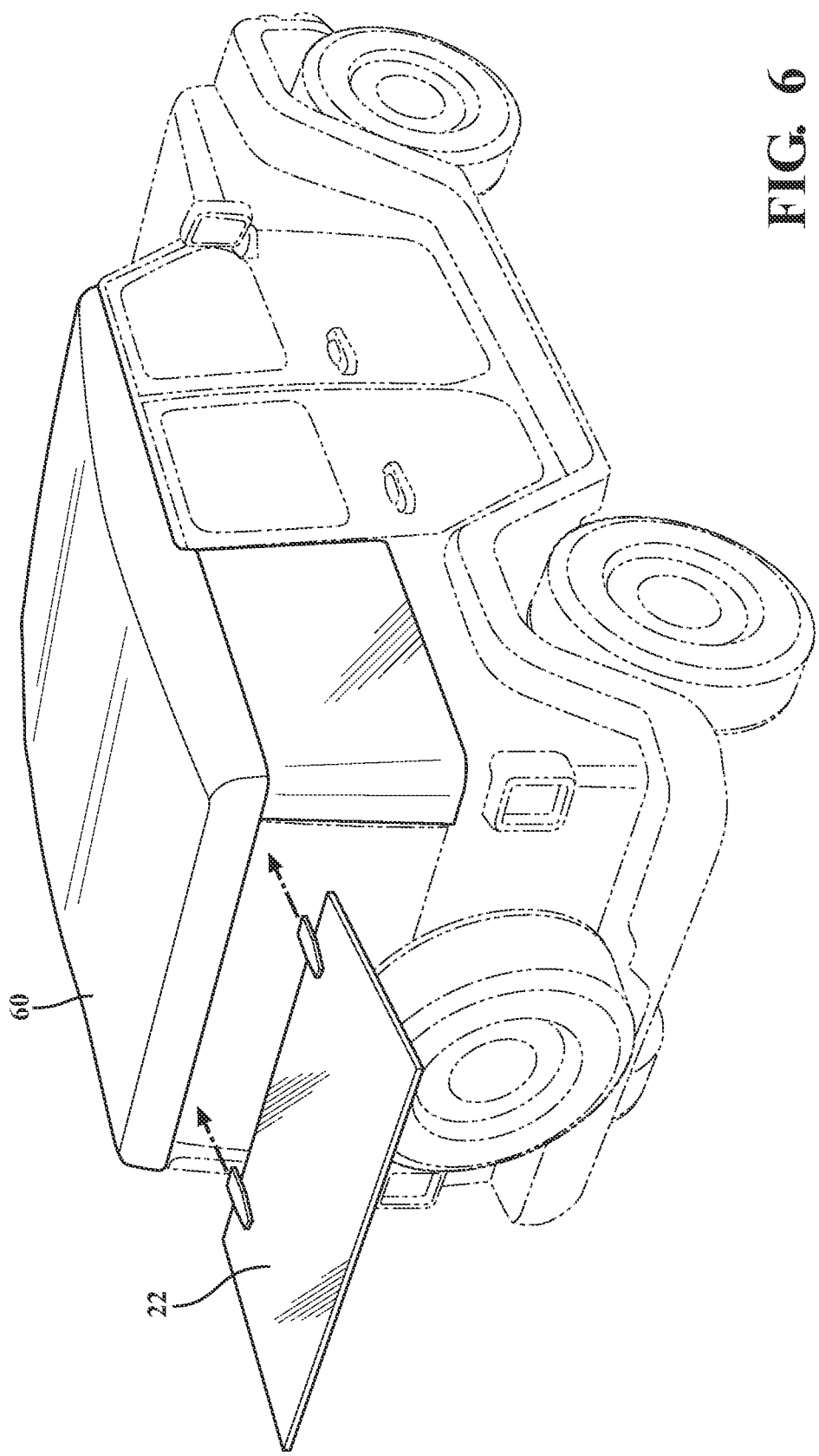
FIG. 6 is a perspective view showing JL TrekTop Ultra add rear glass with Arrows no Deck.
Figure 7:
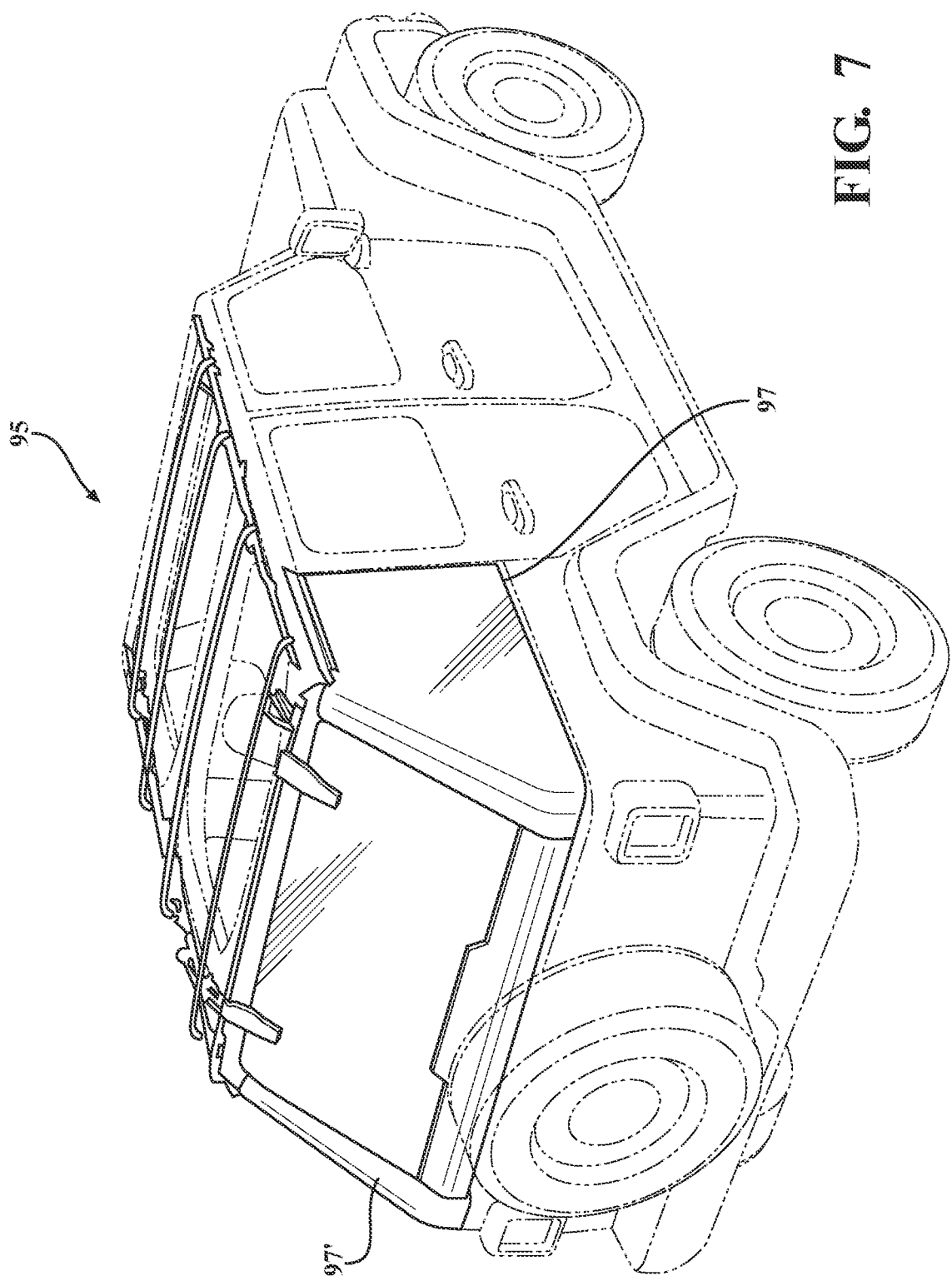
FIG. 7 is a perspective view showing JL TrekTop Ultra add rear glass and sides no Deck.
Figure 8:
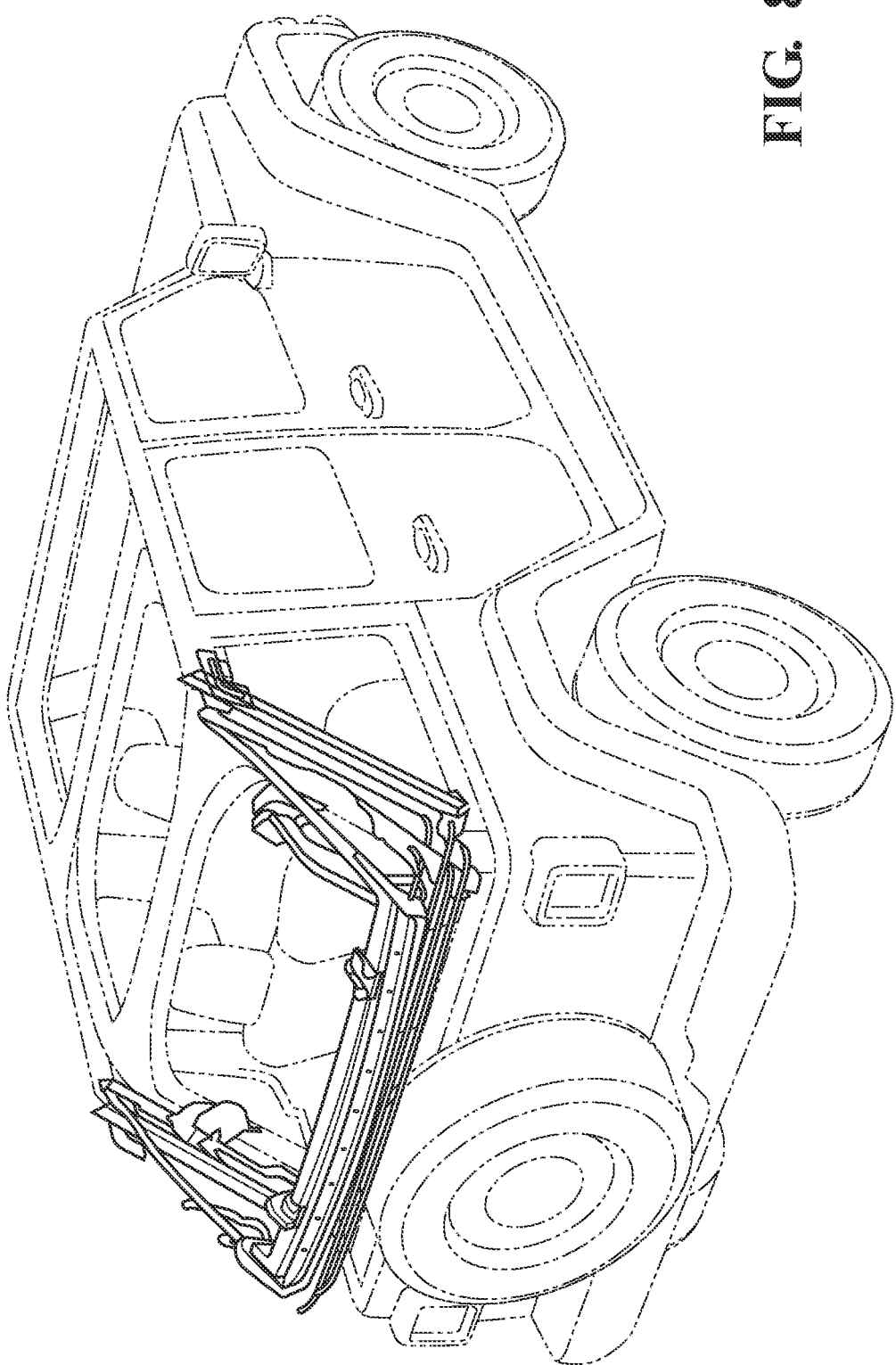
FIG. 8 is a perspective view showing JL Ultra Kinematic Siderail and Kinematic Mech Downstacked.
Figure 9:
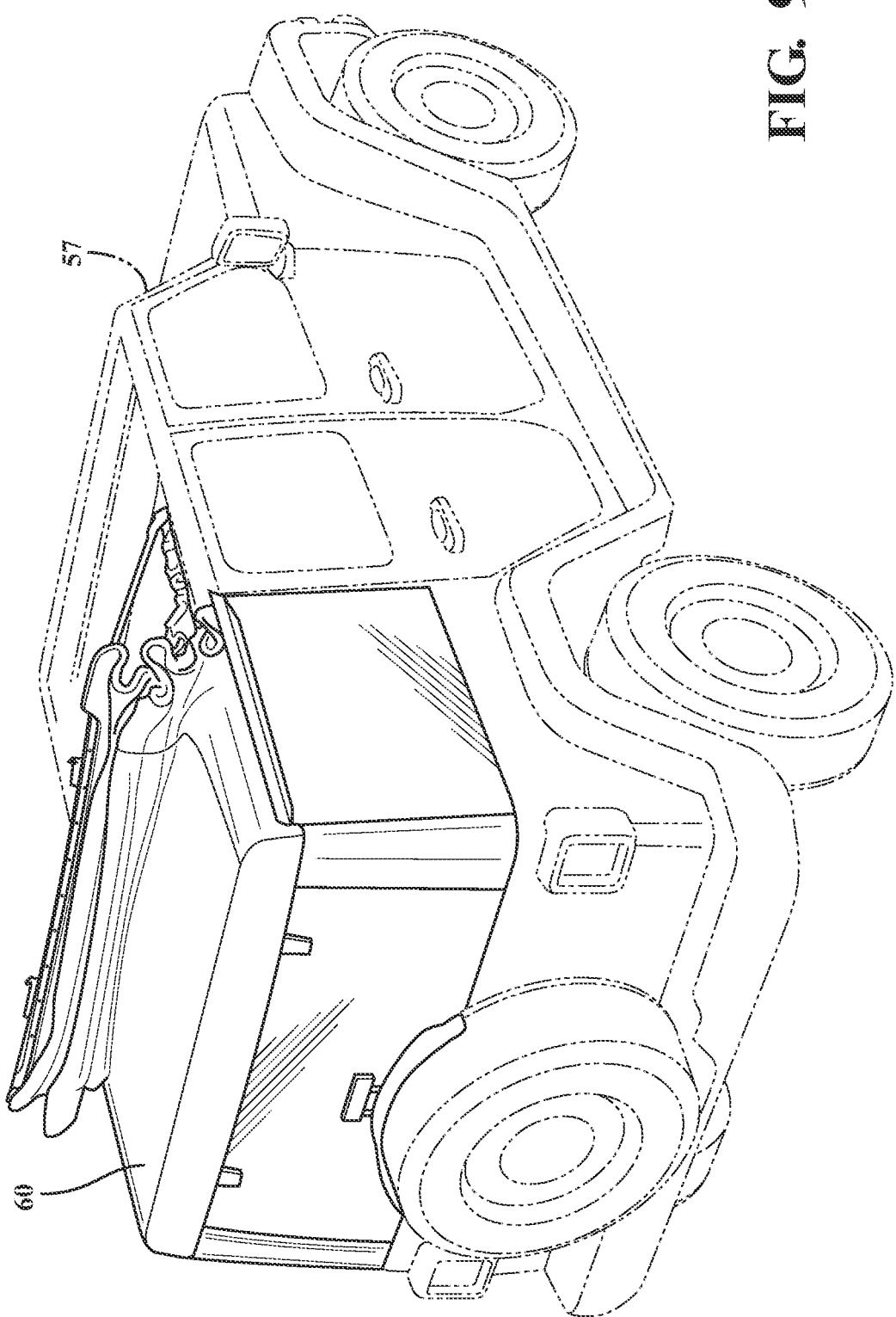
FIG. 9 is a perspective view showing JL Ultra Kinematic Siderail and Kinematic Mech Sunrider Open With all 3 Rear Glass.
Figure 10:
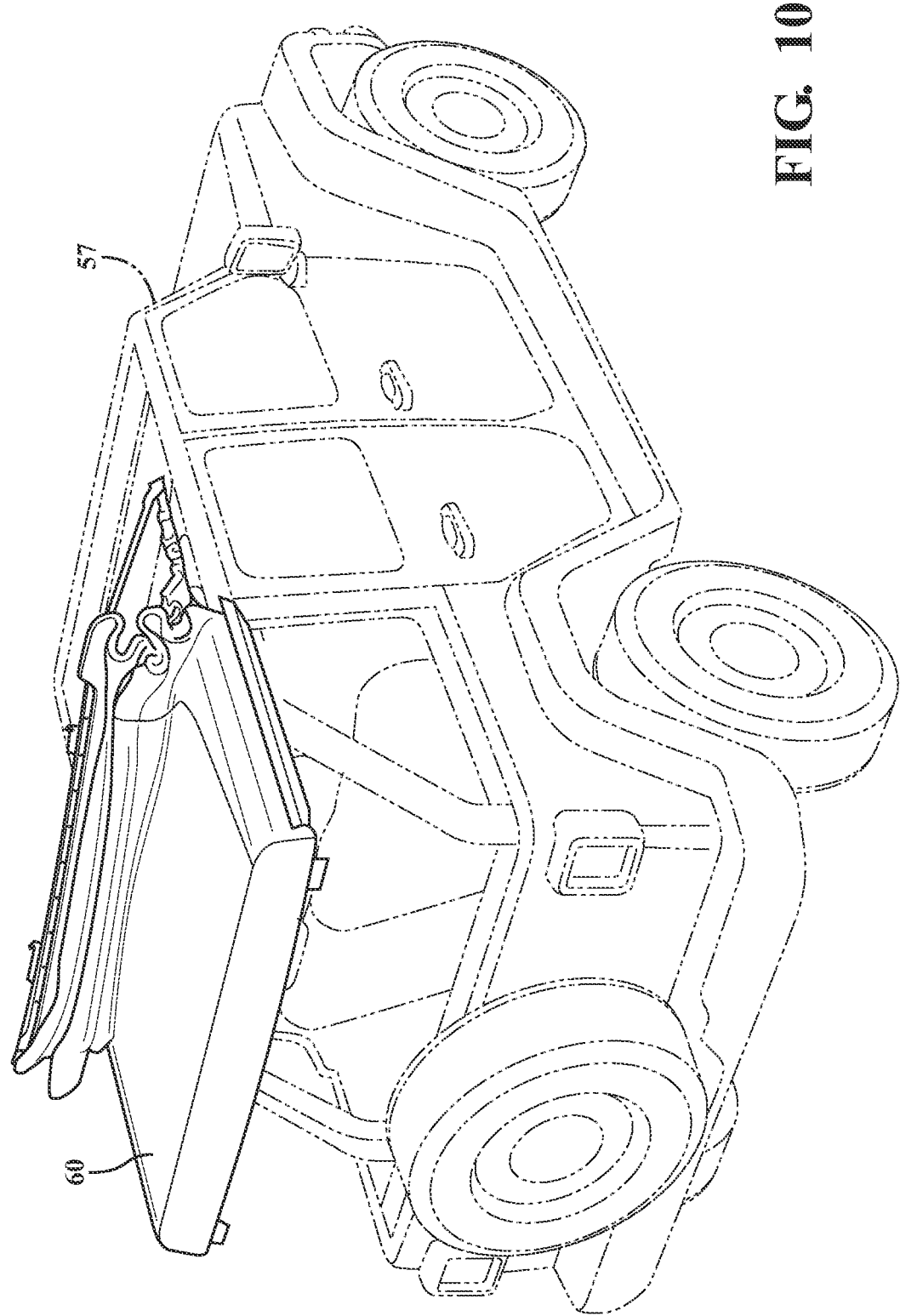
FIG. 10 is a perspective view showing JL Ultra Kinematic Siderail and Kinematic Mech Sunrider Open.
Figure 11:
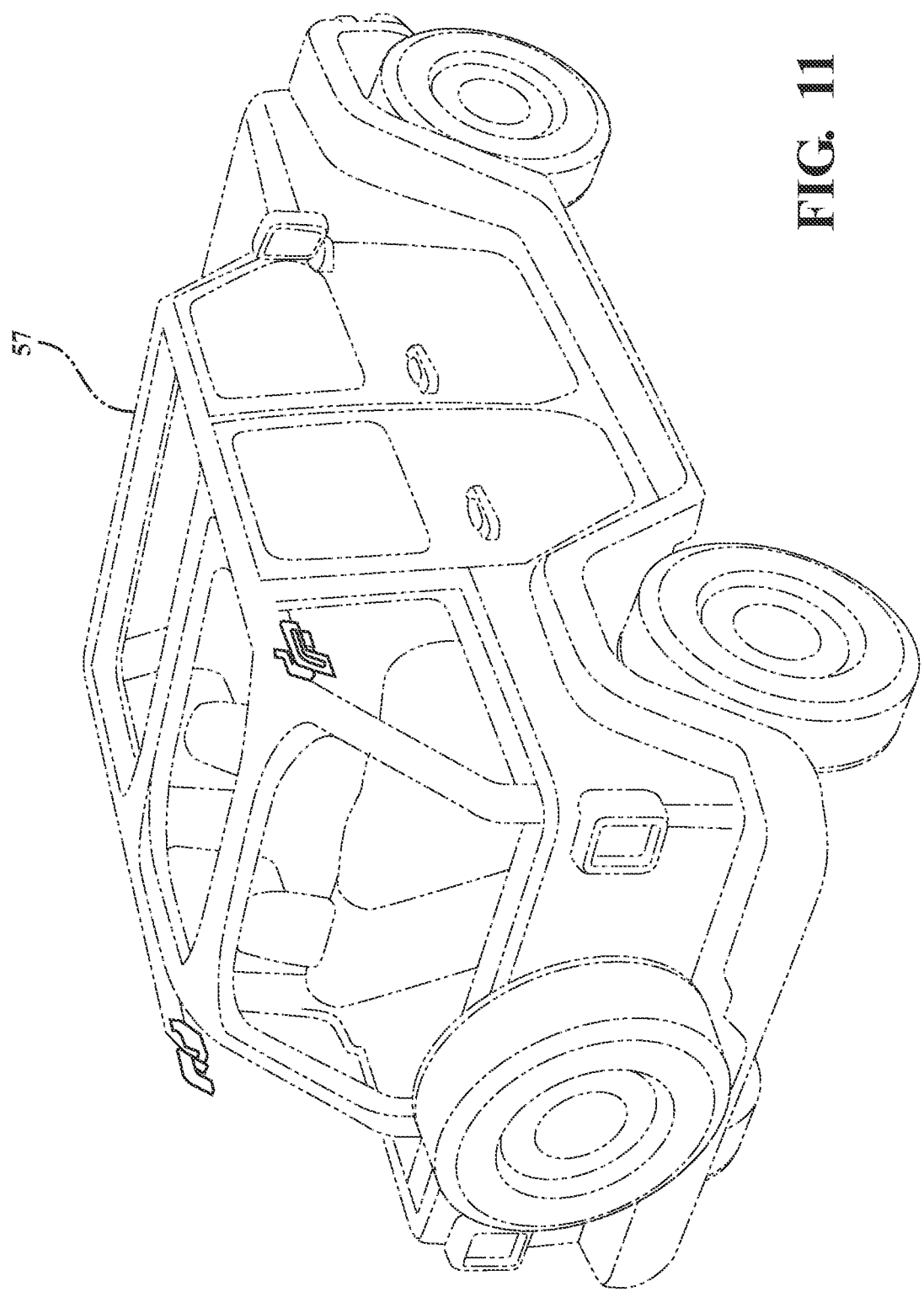
FIG. 11 is a perspective view showing JL Ultra Kinematic Siderail brackets.
Figure 12:
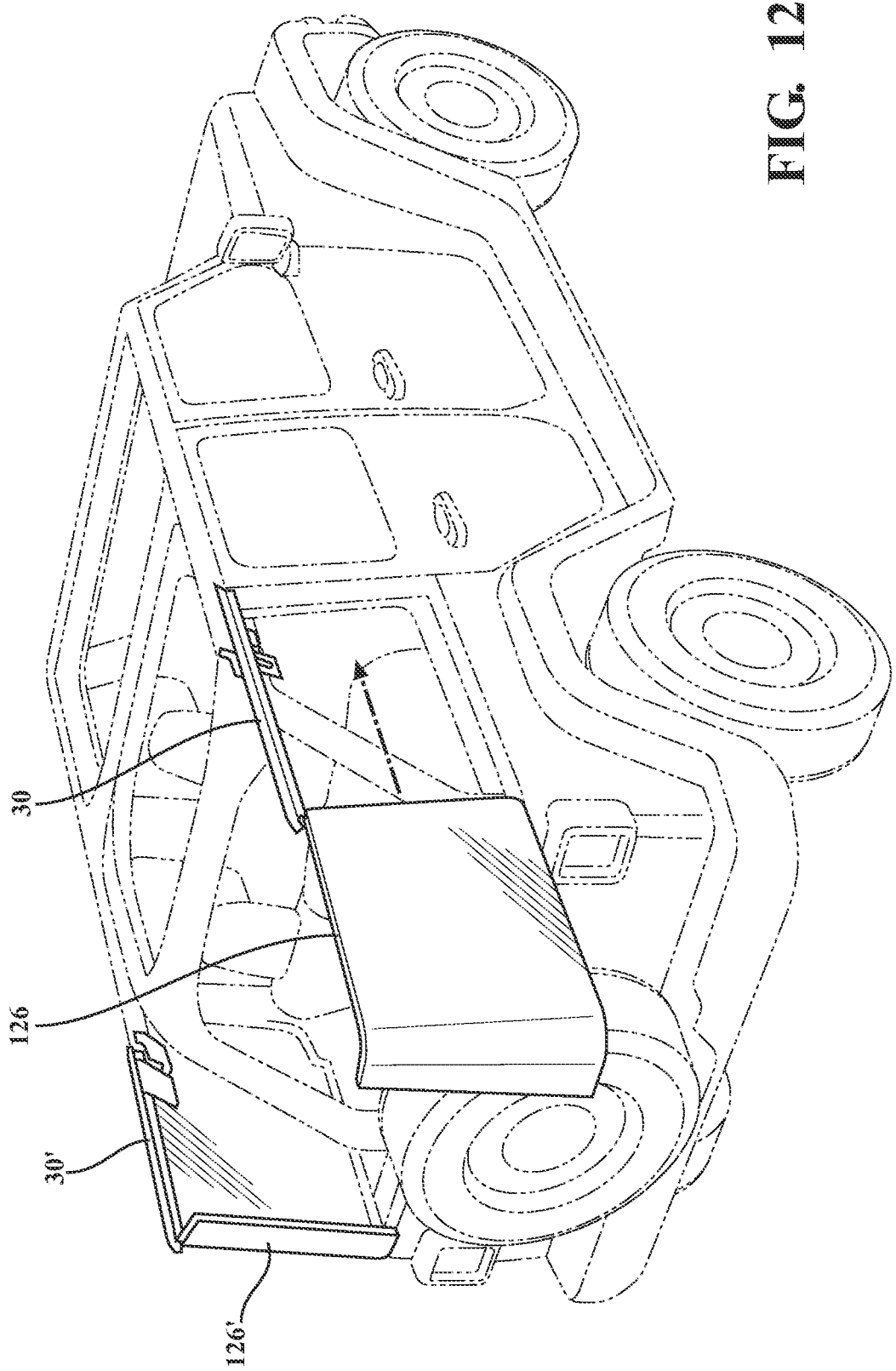
FIG. 12 is a perspective view showing JL Ultra Kinematic Siderails slide in windows.
Figure 13:
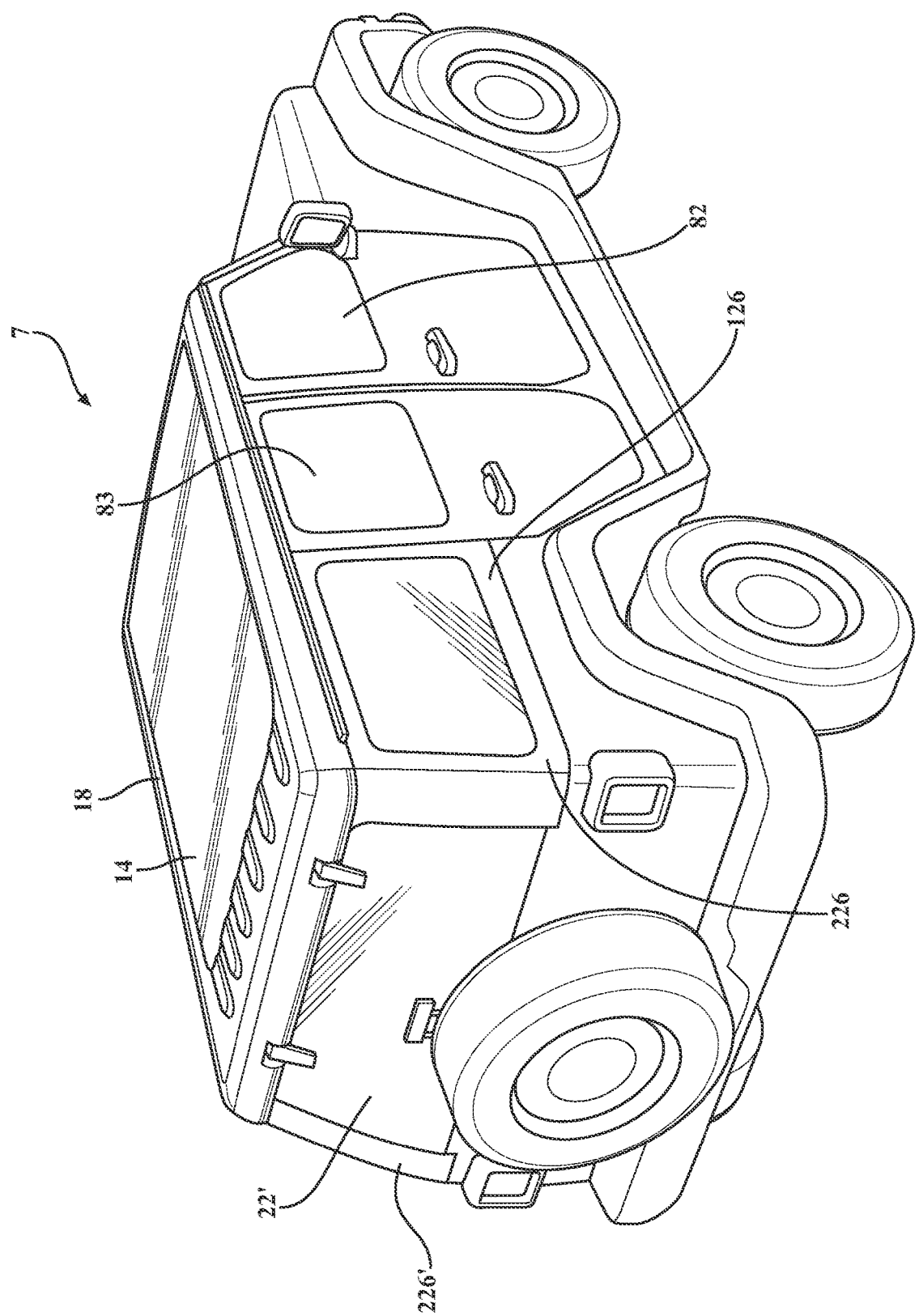
FIG. 13 is a perspective view showing Hard Rear Roof With Cloth 2 Front Row Cover.
Figure 14:
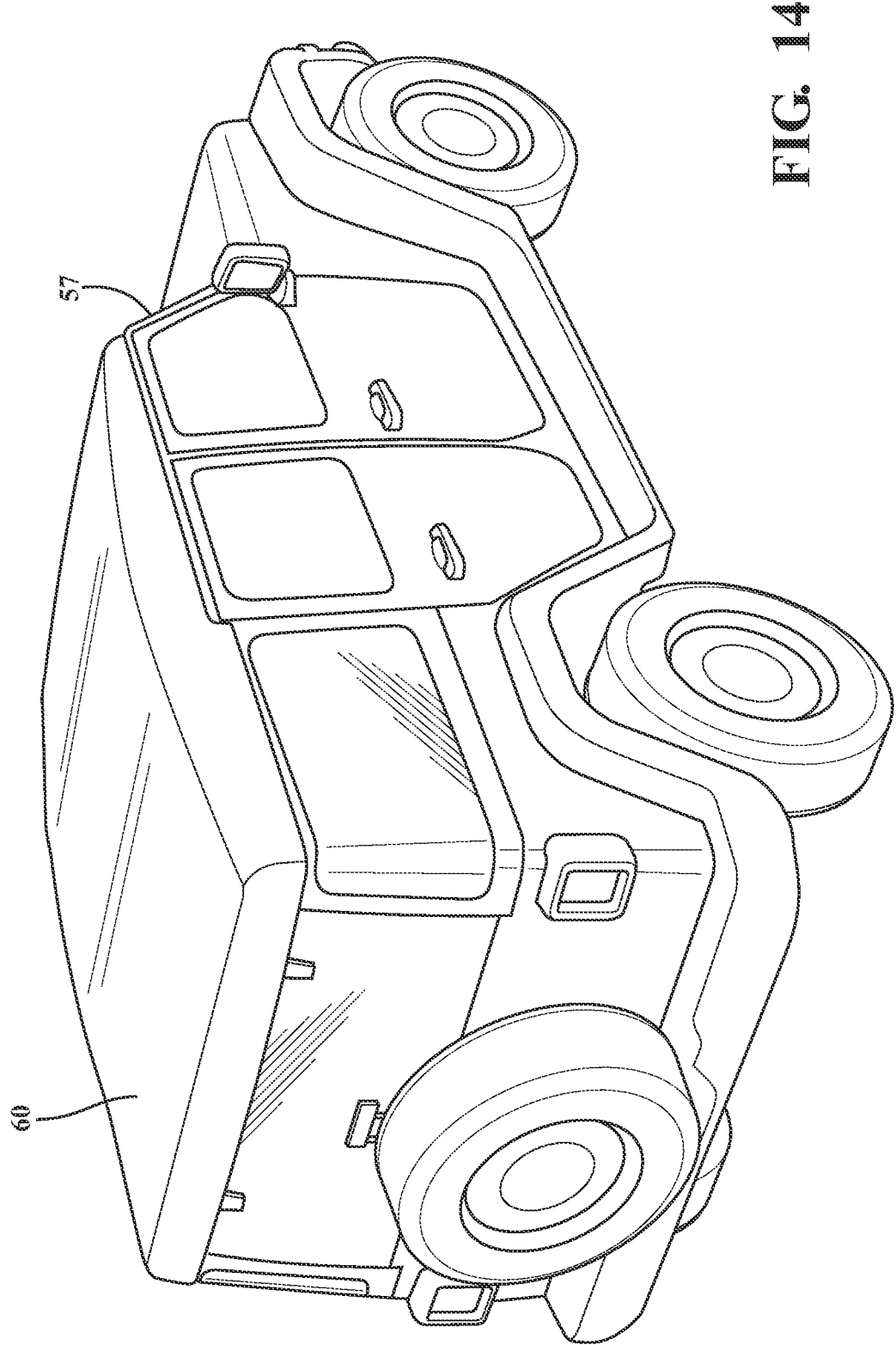
FIG. 14 is a perspective view showing JL Ultra Kinematic with PC corners Black Overlays.
Figure 15:
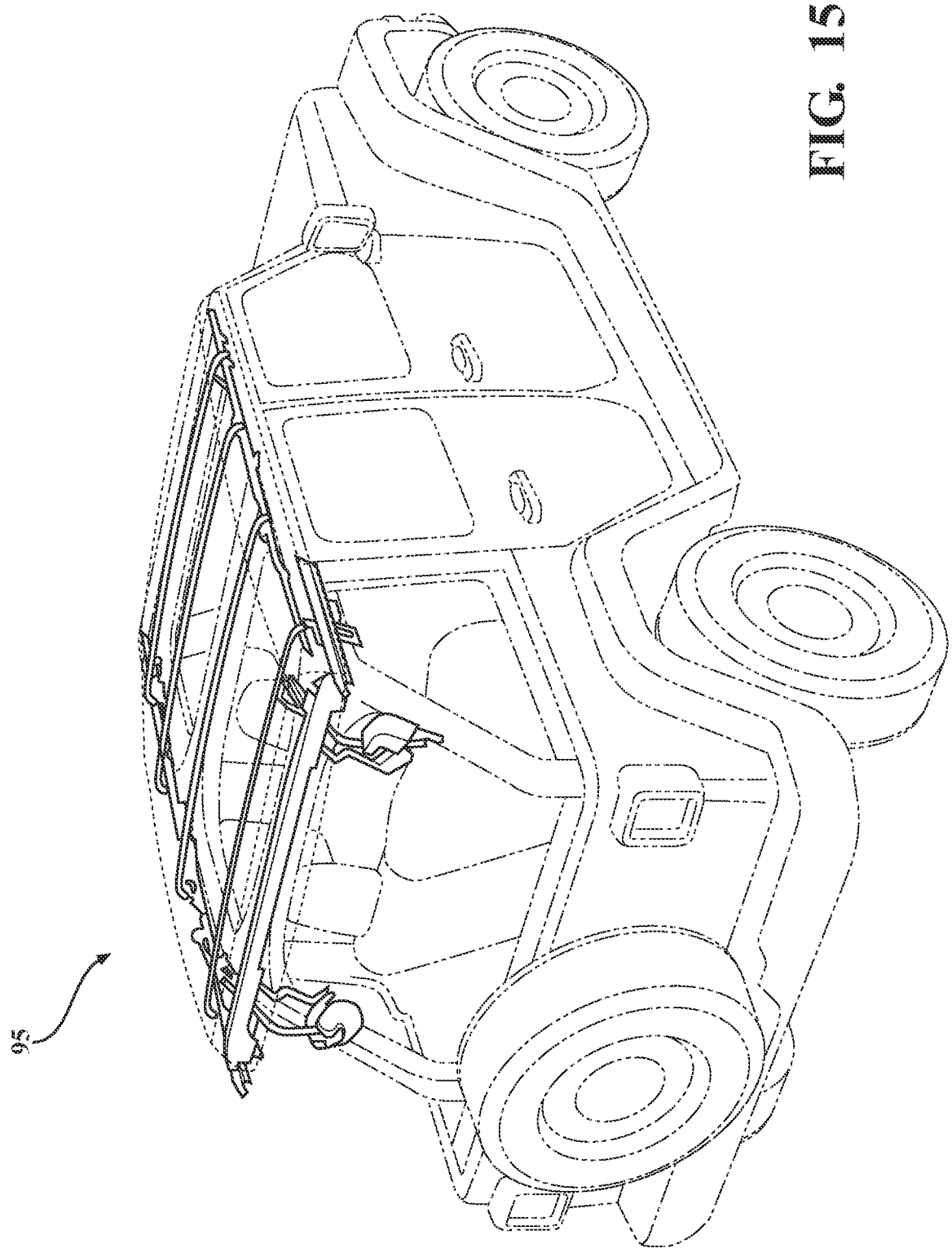
FIG. 15 is a perspective view showing JL TrekTop Ultra Ghost Deck.
Figure 16:
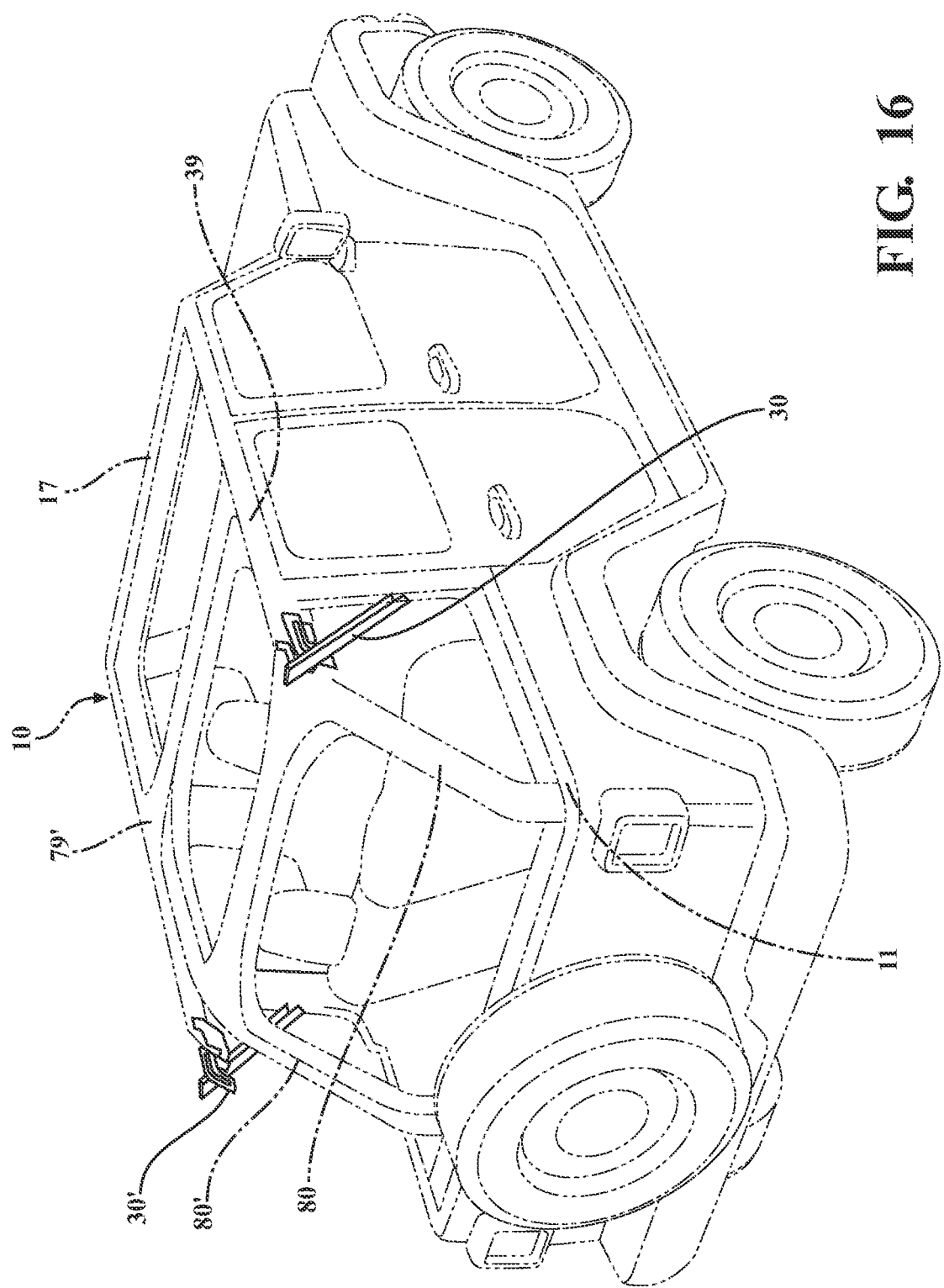
FIG. 16 is a perspective view showing JL TrekTop Ultra Side Arms Down.
Figure 17:
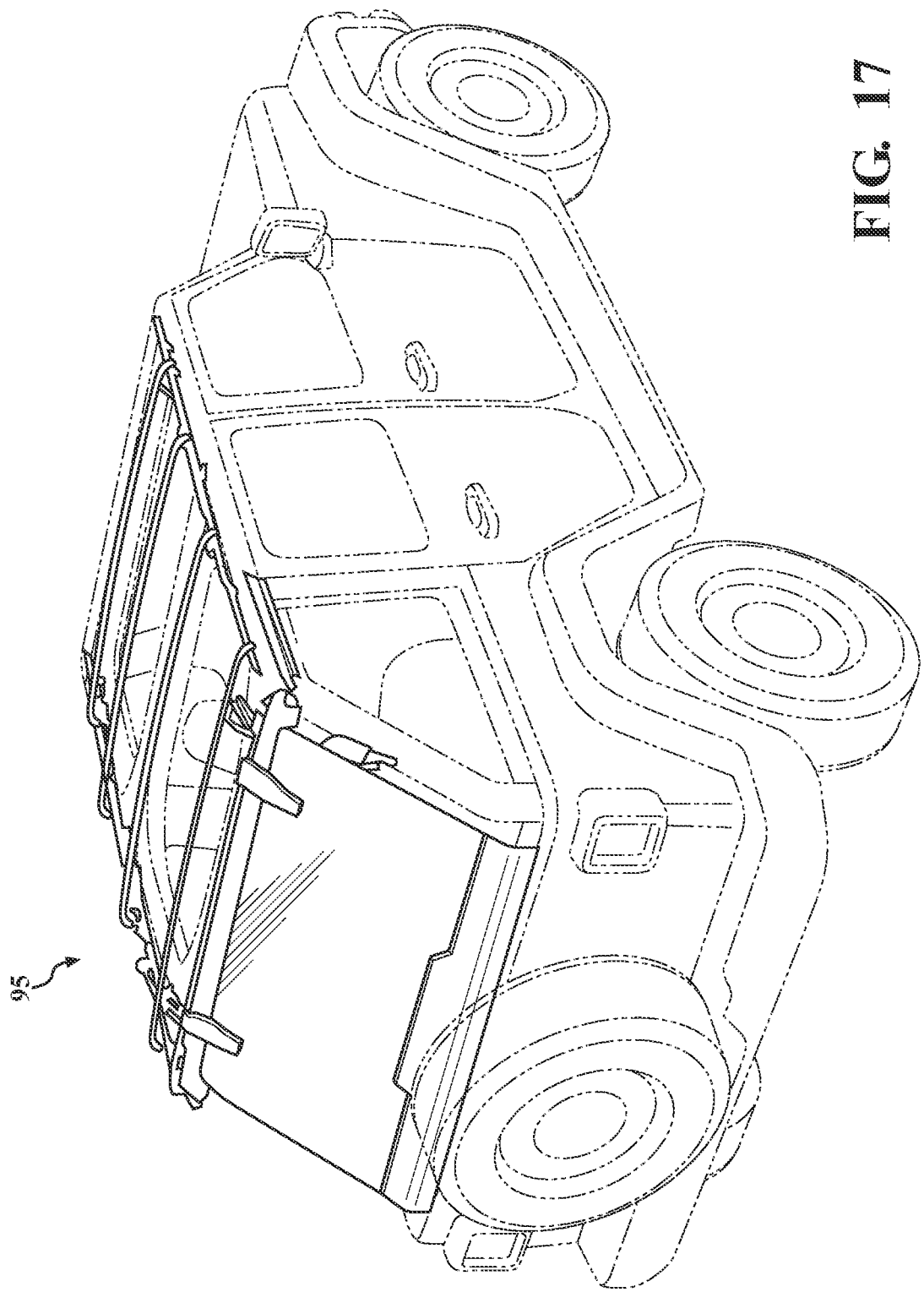
FIG. 17 is a perspective view showing JL TrekTop Ultra add rear glass no Deck.
Figure 18:
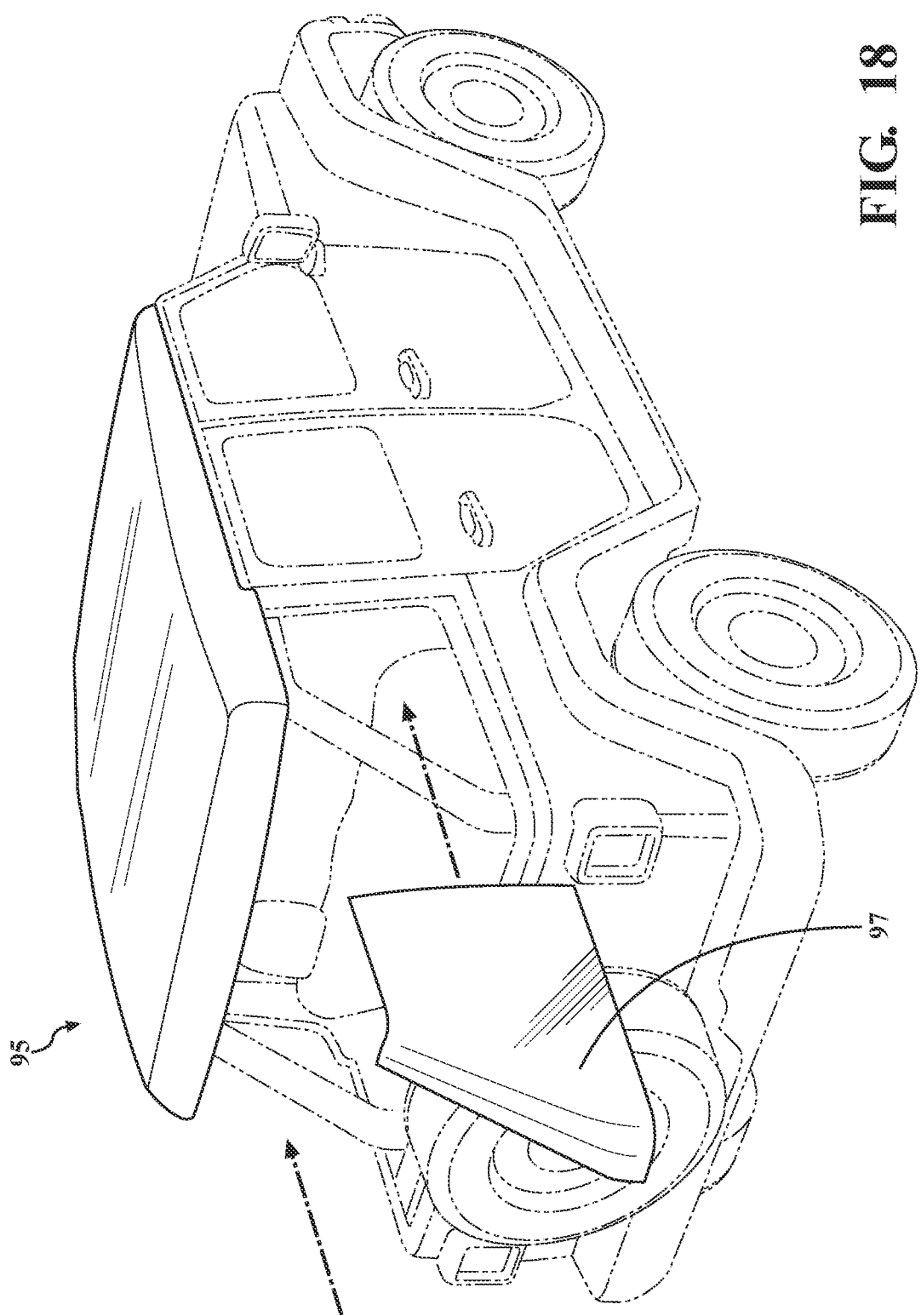
FIG. 18 is a perspective view showing JL TrekTop Ultra closed Slide in Quarter.
Figure 19:
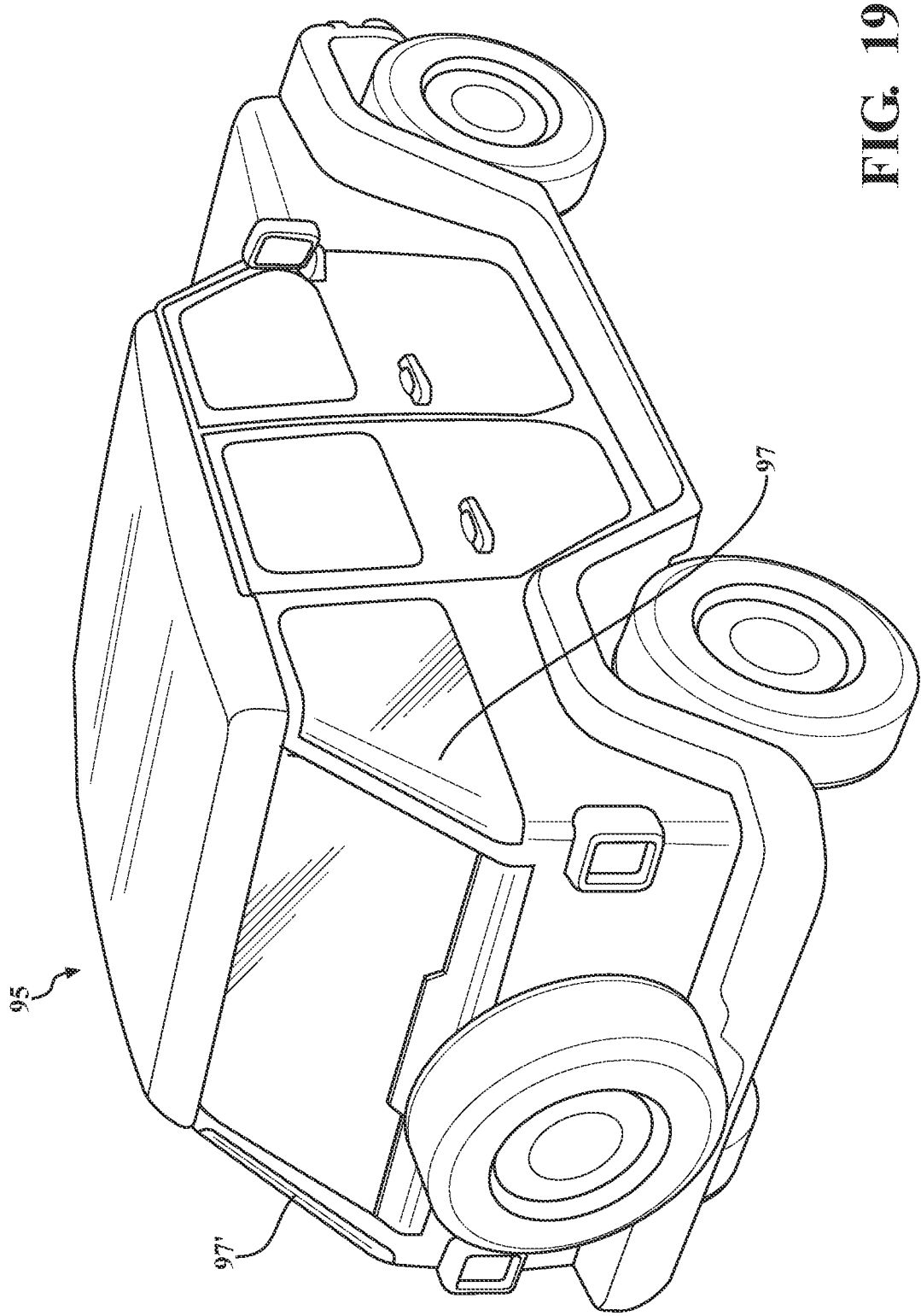
FIG. 19 is a perspective view showing JL TrekTop Ultra closed up full RED overlay FUL VIEW.
Figure 20:
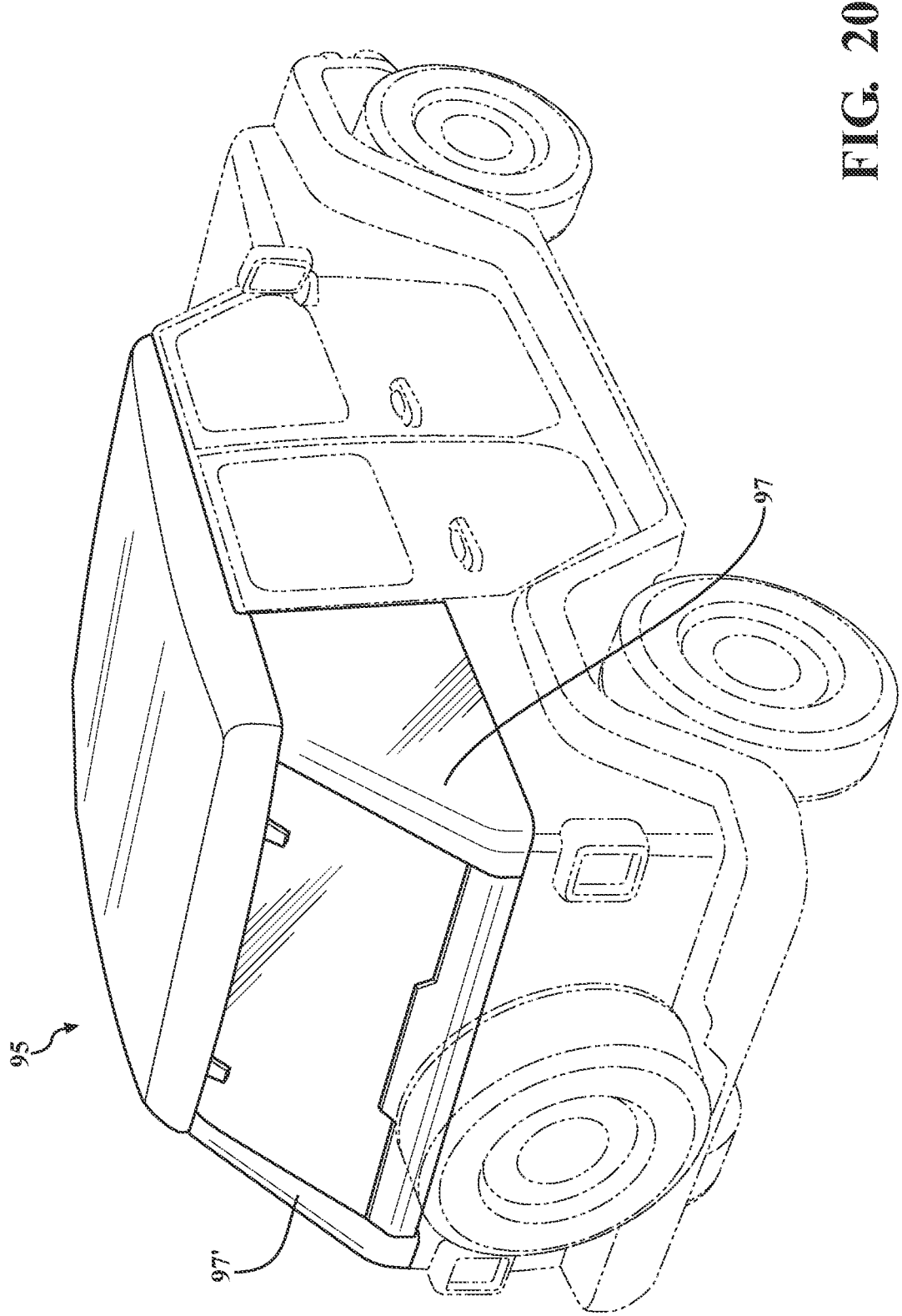
FIG. 20 is a perspective view showing JL TrekTop Ultra closed up full.
Figure 21:
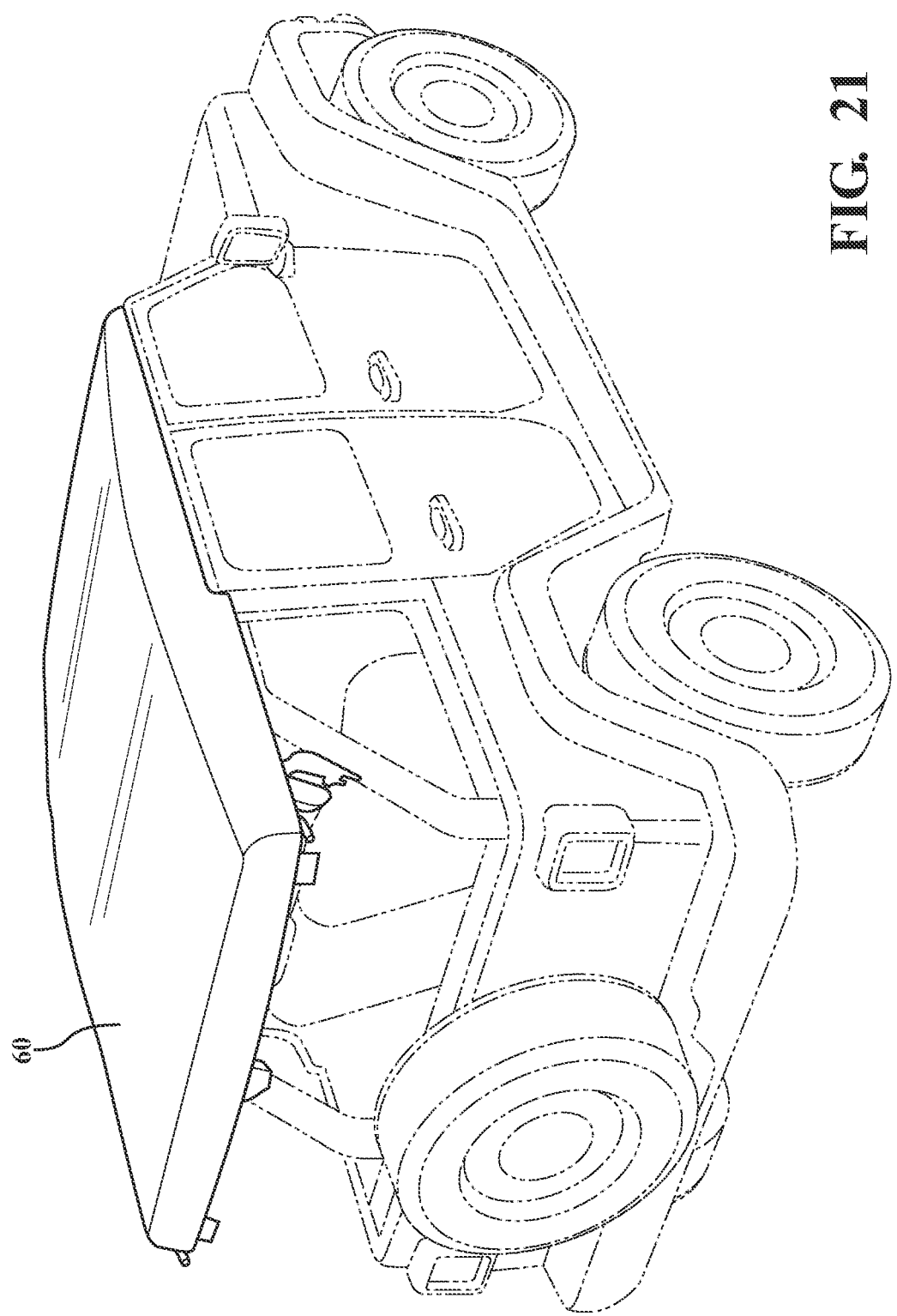
FIG. 21 is a perspective view showing JL Ultra Kinematic Siderail and Kinematic Mech Dexck closed.
Figure 22:
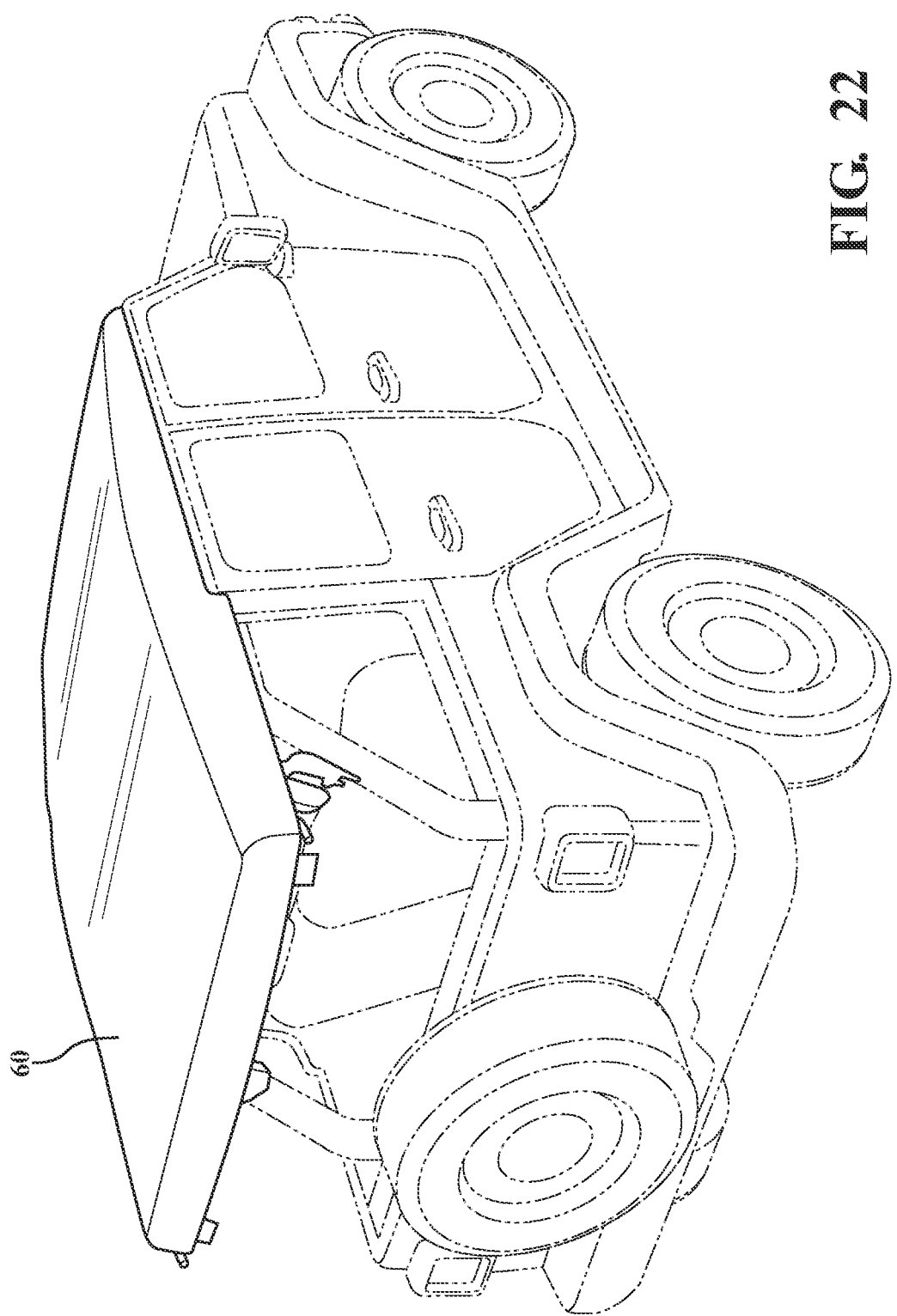
FIG. 22 is a perspective view showing JL Ultra Kinematic Siderail and Kinematic Mech Dexck closed.
Figure 25:
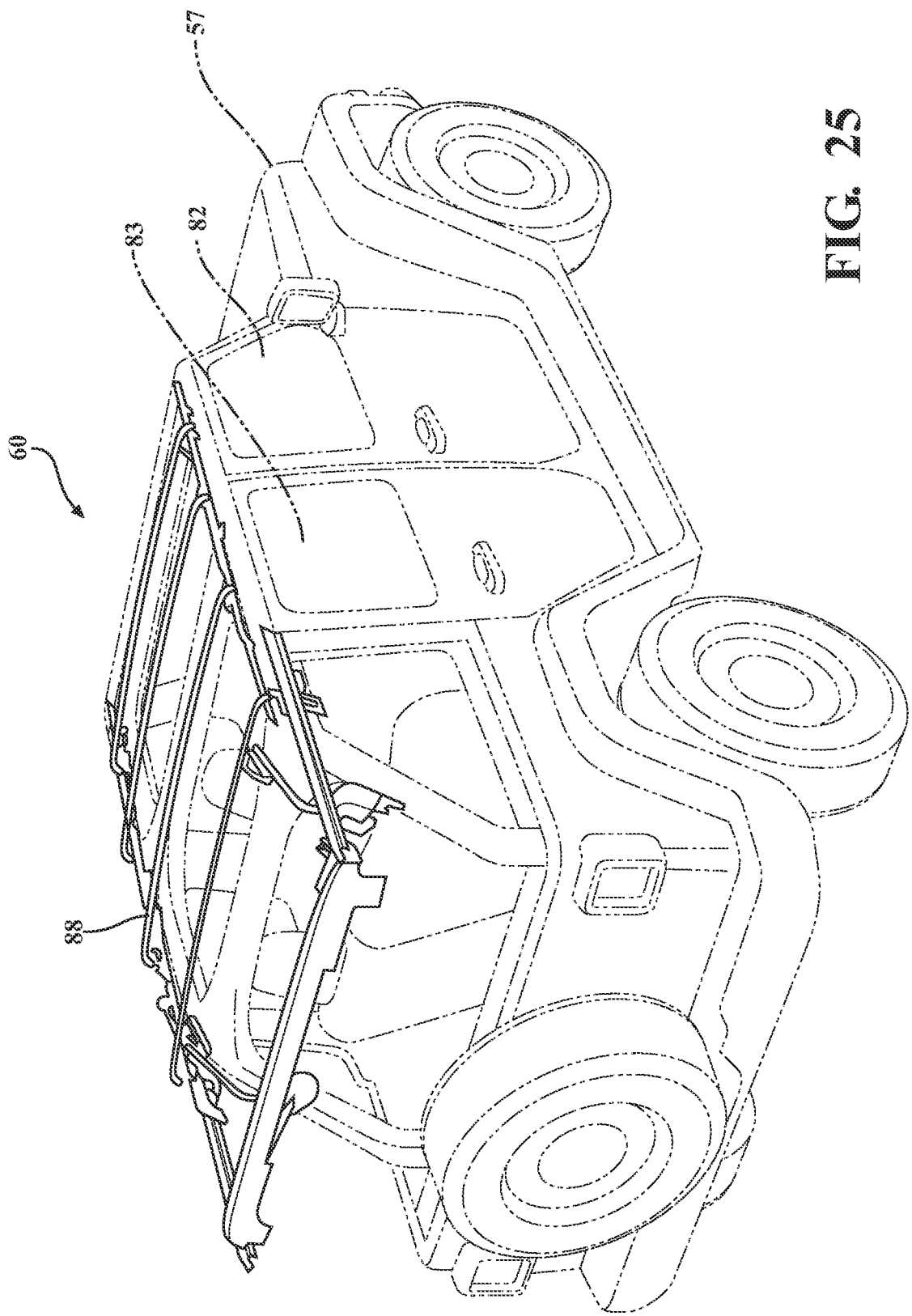
FIG. 25 is a perspective view showing JL Ultra Kinematic Siderail and Kinematic Mech.
Figure 26:
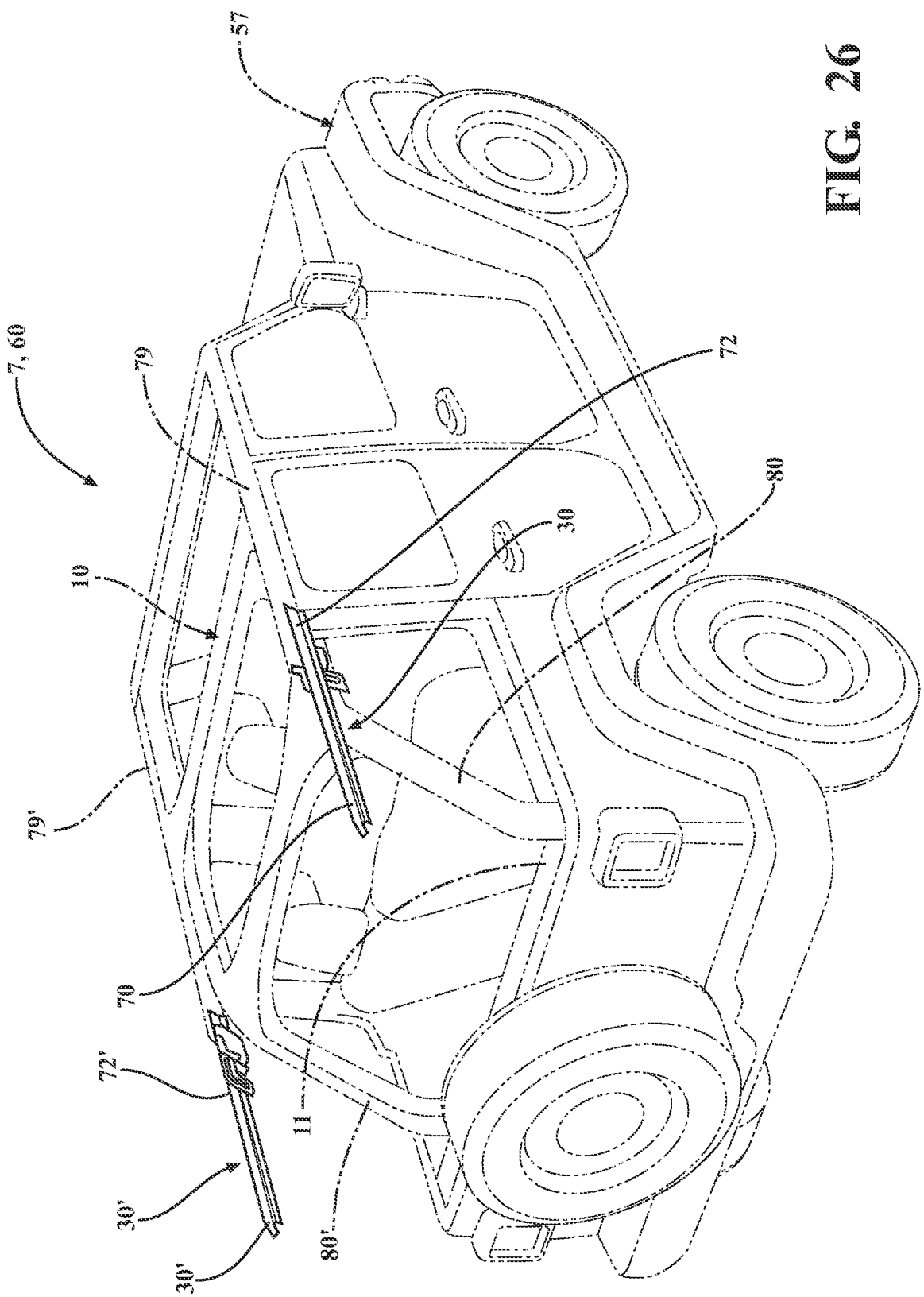
FIG. 26 is a perspective view showing JL Ultra Kinematic Siderails on brackets.

12, 16 and 26) connected with the roll cage longitudinal support beams 79, 79' extending rearwardly therefrom at least partially supporting rigid rear quarter panels 126, 126' that can be longitudinally installed in a manner as previously shown (see FIGS. 1 and 2) and can have a side window 92. The roof support frame structure additionally supports a pivotable rear window 22, 22' (FIGS. 5, and 25). In a hatchback roofing system 95 (FIGS. 7, 15 and 17-20) rear quarter panels 97, 97' are shaped for a hatchback. In the roofing system of (FIG. 23) wherein a front portion of the roof folds over a top of a rear portion of the roof. The roofing system of (FIGS. 1, 2, 5, 9, 14, 19 wherein the quarter panel has a rear portion forming a rear portion of the roof extending transversely of the vehicle. The roof supporting system of FIG. 1 the entire quarter panel forms a window.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A roofing system for a vehicle having a parallel separated longitudinal support beam structure extending roll cage with rear ends of the longitudinal support beams inclined to a belt line of the vehicle, the system comprising:
    a rigid portion extending transverse of the vehicle;
    a cloth portion forward of the rigid portion covering at least a front seating row of the vehicle being openable;
    one or more sidearms connected to one of the rear ends of the roll cage, the one or more side arms extending rearwardly therefrom and at least partially supporting the rigid portion.

2. The roofing system of claim 1 having a pivotable rear window.

3. The roofing system of claim 1 having at least one rear quarter window that at least partially supports said rigid portion.

4. A roofing system for a vehicle having a roll cage with a parallel separated longitudinal support beam structure having rear ends of the longitudinal support beams inclined to a belt line of the vehicle, the system comprising:
    a cloth cover extending the full length of the roof of the vehicle;
    wherein the cloth cover extends over the at least a front seating row of the vehicle is openable;
    two rigid rear quarter panels, wherein the parallel separated longitudinal support beam structure supports the two rigid rear quarter panels, and
    two side arms connected with and extending rearwardly from the parallel separated longitudinal support beam structure, where in a first one of the two side arms at least partially supports a first one of the two rigid rear quarter panels and a second one of the two side arms at least partially supports a second one of the two rigid rear quarter panels.

5. The roofing system of claim 4 wherein the cloth cover over at least 2 rows of seating is openable.

6. The roofing system of claim 4 wherein each of the two rigid rear quarter panels has a side window.

7. The roofing system of claim 4 further comprising a roof supporting framework additionally supporting a pivotable rear window.

8. The roofing system of claim 4 wherein the two rigid rear quarter panels are shaped as a hatchback.

9. The roofing system of claim 4 wherein the cloth cover of the roof has a front portion that folds over a top of a rear portion.

10. The roof supporting system of claim 4 wherein each of the two rigid rear quarter panels has a rear portion forming a rear portion of the roof extending transversely of the vehicle.

11. The roof supporting system of claim 8 wherein each of the two rigid rear quarter panels has a rear portion forming a rear portion of the roof extending transversely of the vehicle.

12. The roof supporting system of claim 4 wherein each one of the two side arms include two member fastener connected longitudinal brackets connected with the roll cage longitudinal support beams extending rearwardly therefrom and at least partially supporting rigid rear quarter panels.

13. The roof supporting system of claim 4 wherein the quarter panel has a rear portion forming a rear portion of the roof extending transversely of the vehicle and forms a window.

14. The roofing system of claim 6 wherein the entire one of each of the two rigid rear quarter panels forms a window.

15. The roofing system of claim 10 wherein the entire one of each of the two rigid rear quarter panels forms a window.

* * * * *